US012391220B2

(12) United States Patent
Brandon

(10) Patent No.: US 12,391,220 B2
(45) Date of Patent: Aug. 19, 2025

(54) DETECTION OF A STUCK VEHICLE DOOR DUE TO ICE FORMATION

(71) Applicant: GM Cruise Holdings LLC, San Francisco, CA (US)

(72) Inventor: Jeffrey Brandon, Phoenix, AZ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 208 days.

(21) Appl. No.: 18/345,101

(22) Filed: Jun. 30, 2023

(65) Prior Publication Data

US 2025/0001979 A1 Jan. 2, 2025

(51) Int. Cl.
*B60S 1/66* (2006.01)
*B60H 1/00* (2006.01)
*E05F 15/60* (2015.01)

(52) U.S. Cl.
CPC ............ *B60S 1/66* (2013.01); *B60H 1/00785* (2013.01); *B60H 1/00871* (2013.01); *E05F 15/60* (2015.01); *E05Y 2201/434* (2013.01); *E05Y 2400/44* (2013.01); *E05Y 2900/531* (2013.01)

(58) Field of Classification Search
CPC ........ B60S 1/66; E05F 15/60; B60H 1/00785; B60H 1/00871; E05Y 2201/434; E05Y 2400/44; E05Y 2900/531

USPC .......................................................... 701/36
See application file for complete search history.

(56) References Cited

U.S. PATENT DOCUMENTS

| 2016/0236547 A1* | 8/2016 | Wojdyla ................. E05F 15/632 |
| 2017/0324667 A1* | 11/2017 | Camacho ........ H04M 1/724098 |
| 2020/0300020 A1* | 9/2020 | Molnar .................... E05F 15/77 |
| 2021/0301561 A1* | 9/2021 | Cumbo .................... E05B 81/06 |
| 2022/0243521 A1* | 8/2022 | Herman ..................... B60R 1/06 |
| 2023/0129663 A1* | 4/2023 | Kim .......................... H05B 3/34 |
| | | 49/70 |
| 2025/0027346 A1* | 1/2025 | Klocke ................... E05B 81/70 |

* cited by examiner

*Primary Examiner* — Mahmoud S Ismail
(74) *Attorney, Agent, or Firm* — CANTOR COLBURN LLP

(57) ABSTRACT

Systems and methods for detecting and responding to stuck vehicle doors, where the doors are stuck due to ice formation on the vehicle. In particular, systems and methods are provided to utilize diagnostic signals from the vehicle door motor controller to automate the process of detecting stuck doors due to ice formation. Vehicle internal systems can be used to attempt to unstick a stuck door without manual intervention. Additionally, vehicle routing can be used to unstick a stuck door without manual intervention. For example, a vehicle can be routed to a facility where the temperature is above freezing so any ice formation on the vehicle will melt. Vehicle routing can also be used to route the vehicle to a facility for service to unstick the stuck door.

16 Claims, 7 Drawing Sheets

DETECTION OF A STUCK VEHICLE DOOR DUE TO ICE FORMATION

BACKGROUND

1. Technical Field

The present disclosure generally relates to vehicle door function and, more specifically, to detecting a stuck vehicle door due to ice formation.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for detecting and responding to stuck vehicle doors, where the doors are stuck due to ice formation on the vehicle. In particular, systems and methods are provided to utilize diagnostic signals from the vehicle door motor controller to automate the process of detecting stuck doors due to ice formation. Vehicle internal systems can be used to attempt to unstick a stuck door without manual intervention. Additionally, vehicle routing can be used to unstick a stuck door without manual intervention. For example, a vehicle can be routed to a facility where the temperature is above freezing so any ice formation on the vehicle will melt. Vehicle routing can also be used to route the vehicle to a facility for service to unstick the stuck door.

In cold climates, vehicles are often exposed to situations where ice forms on the surface of the vehicle including the interface between the vehicle doors and the body of the vehicle. Generally, a person can clear off the vehicle surfaces before driving. However, autonomous vehicles do not have a driver, and autonomous vehicle fleets can operate many autonomous vehicles with minimal interaction from fleet personnel. While personnel can be deployed to clear vehicles of ice and snow and ensure vehicle doors function properly, in some cases only a portion of fleet vehicles may need attention. In various examples, determining which vehicles have ice accumulation causing degradation door performance related to ice formation can help minimize manual labor for inspecting and/or clearing ice off vehicles prior to vehicle deployment during and/or after a wintry event. Additionally, determining which vehicles have ice accumulation causing degradation door performance related to ice formation can help minimize the number of vehicles that are returned to a facility to resolve door function, thus eliminating unnecessary interruptions to ridehail and delivery operations. Thus, automating the process of detecting degradation in vehicle door performance due to ice formation can improve operational efficiency of an autonomous vehicle fleet.

Example Vehicle for Detection of a Stuck Vehicle Door Due to Ice Formation

Figure 1A:
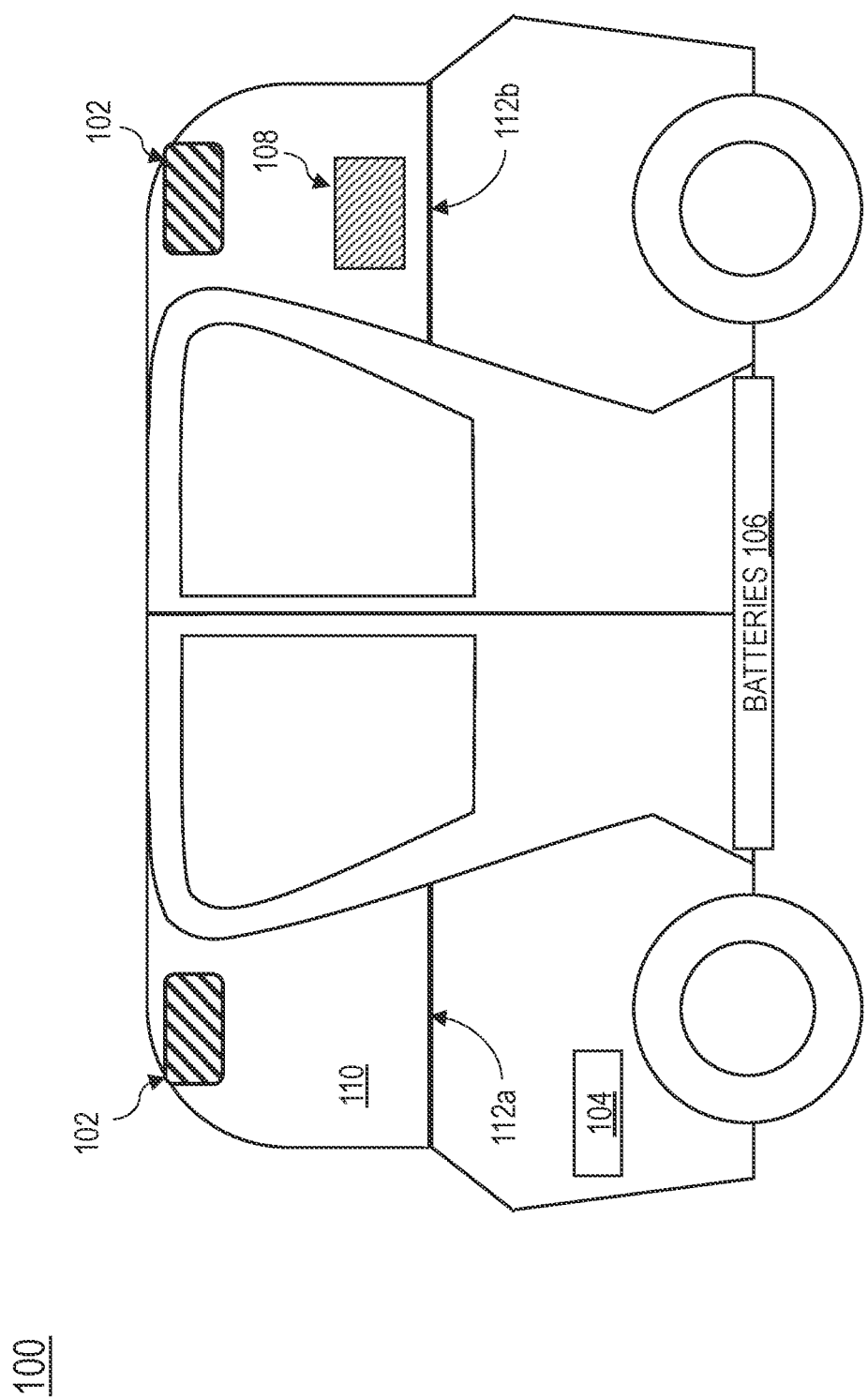
FIGS. 1A-1B illustrate vehicles for stuck door detection, according to some examples of the present disclosure.
Figure 1B:
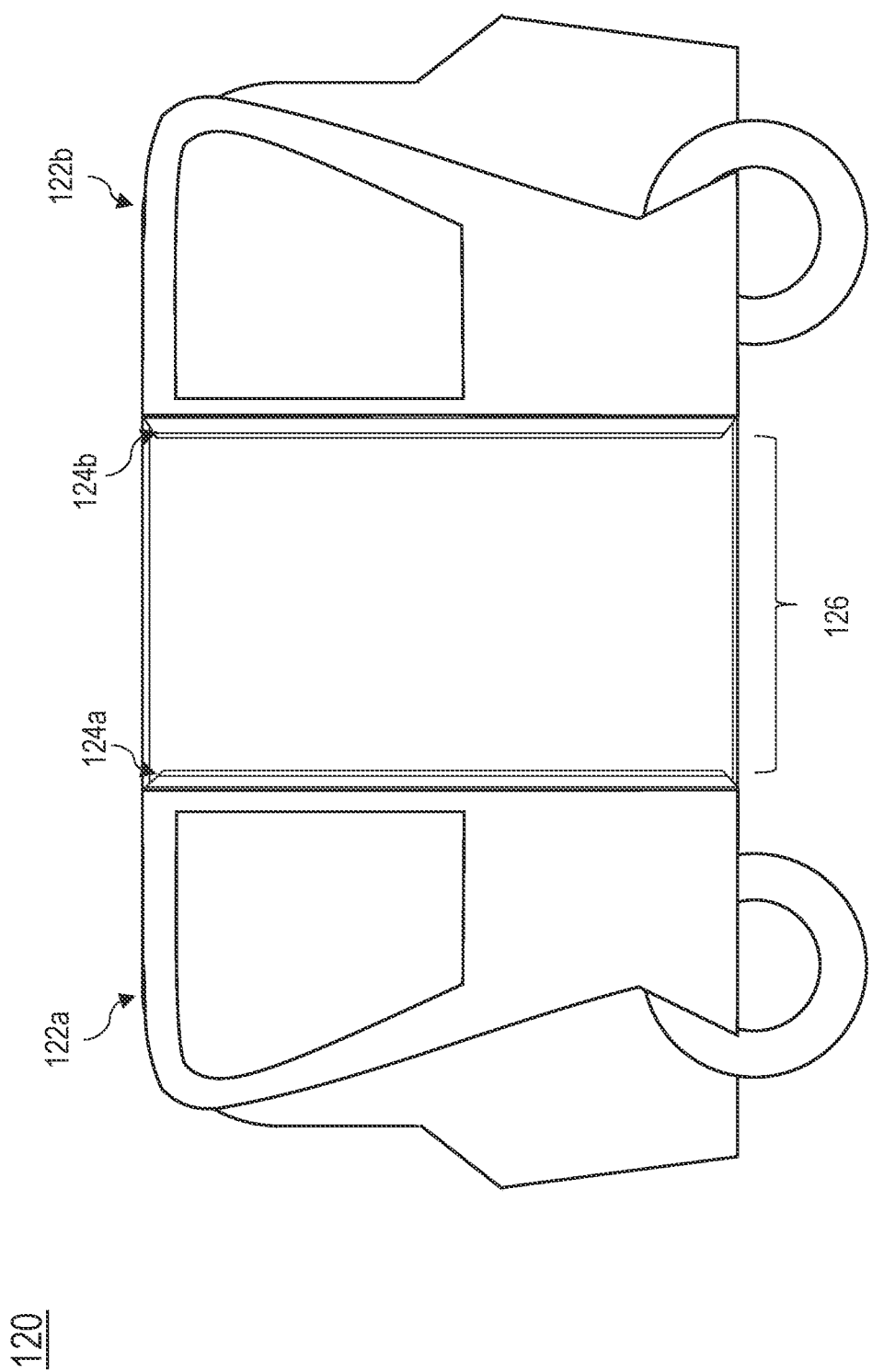

FIGS. 1A-1B illustrate an autonomous vehicle 110 for detection of ice formation causing a stuck vehicle door, according to some examples of the present disclosure. The autonomous vehicle 110 includes a sensor suite 102 and an onboard computer 104. In various implementations, the autonomous vehicle 110 uses sensor information from the sensor suite 102 to determine vehicle location, to navigate traffic, to sense and avoid obstacles, and to sense vehicle surroundings. The autonomous vehicle 110 uses sensor information from the sensor suite 102 to detect ice on the vehicles 110. Additionally, the autonomous vehicle 110 can include a stuck door detection module 108 configured to detect a stuck vehicle door due to ice formation. According to various implementations, the autonomous vehicle 110 is part of a fleet of vehicles for picking up passengers and/or packages and driving to selected destinations. In some examples, the autonomous vehicle 110 is a personal autonomous vehicle that is used by one or more owners for driving to selected destinations. In some examples, the autonomous vehicle 110 can connect with a central computer to download vehicle updates, maps, and other vehicle data.

The stuck door detection module 108 can be configured to utilize diagnostics for door actuator controls to detect a stuck door. For example, the stuck door detection module 108 can detect a spike in motor current for the actuator attempting to open a door. Similarly, stuck door detection module 108 can detect an unexpected reduction in lateral movement of a door. In some examples, the stuck door detection module 108 uses data from an onboard thermocouple to identify environmental conditions in which ice formation is possible.

FIG. 1B shows the autonomous vehicle 110 with the vehicle doors 122*a*, 122*b* open. The doors open apart from one another and close by both sliding back towards the center of the door opening. The vehicle doors 122*a*, 122*b* each have a respective leading edge 124*a*, 124*b*, and a first leading edge 124*a* shingles with a second leading edge 124*b* when the vehicle doors close 122*a*, 122*b*. In some examples, when the vehicle doors 122*a*, 122*b* close, the first leading edge 124*a* overlaps with (sits slightly on top of) the second leading edge 124*b*, similar to how roof shingles overlap. In some examples, the shingling of the doors 122*a*, 122*b* is accomplished through coordinated non-symmetric door closing and opening.

The vehicle doors 122*a*, 122*b* open and close by rolling along rails on the vehicle body. In some examples, there is a top rail on the vehicle body at the top of the door opening 126, and a body rail on the vehicle body at the bottom of the door opening 126. The vehicle doors 122*a*, 122*b* can include rollers at the top of the door that slide along the top rail. Similarly, the vehicle doors 122*a*, 122*b* can include rollers at the bottom of the door that slide along the bottom rail. In some examples, there is also a middle rail 112*a*, 112*b* on the exterior of the vehicle 110, as shown in FIG. 1A.

The sensor suite 102 includes localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items. Additionally, sensor suite 102 data can provide localized traffic information, ongoing road work information, and current road condition information. Furthermore, sensor suite 102 data can provide current environmental information, including roadside environment or parking area environment information and information about other nearby vehicles when parked, as well as the presence of people, crowds, and/or objects on a roadside, sidewalk, or parking area. In this way, sensor suite 102 data from many autonomous vehicles can continually provide feedback to the mapping system and a high fidelity map can be updated as more and more information is gathered. Additionally, sensor suite 102 data can provide local weather information, local temperature information, and information about ice formation on the vehicle 110.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with dynamically configurable field of view. In some examples, the sensor suites 102 can include one or more microphones, ultrasonic sensors, accelerometers, light sensors, and mass sensors.

The autonomous vehicle 110 includes an onboard computer 104 which functions to control the autonomous vehicle 110. The onboard computer 104 processes sensed data from the sensor suite 102 and/or other sensors in order to determine a state of the autonomous vehicle 110. Additionally, the onboard computer 104 processes sensed data from the sensor suite 102 as well as sensor data from other vehicle sensors and data from the stuck door detection module 108 to detect ice formation on the vehicle 110. In some examples, the onboard computer 104 checks for vehicle updates from a central computer or other secure access point. In some examples, a vehicle sensor log receives and stores processed sensed sensor suite 102 data from the onboard computer 104. In some examples, a vehicle sensor log receives sensor suite 102 data from the sensor suite 102. The vehicle sensor log can be used to determine a state of a vehicle and various maintenance items such as charging, cleaning, and potential vehicle damage.

In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle and to detect snow and ice accumulation on the autonomous vehicle 110. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIGS. 1A, 1B function to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicle may be a vehicle that switches between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Stuck Door Detection Module Example

Figure 2:
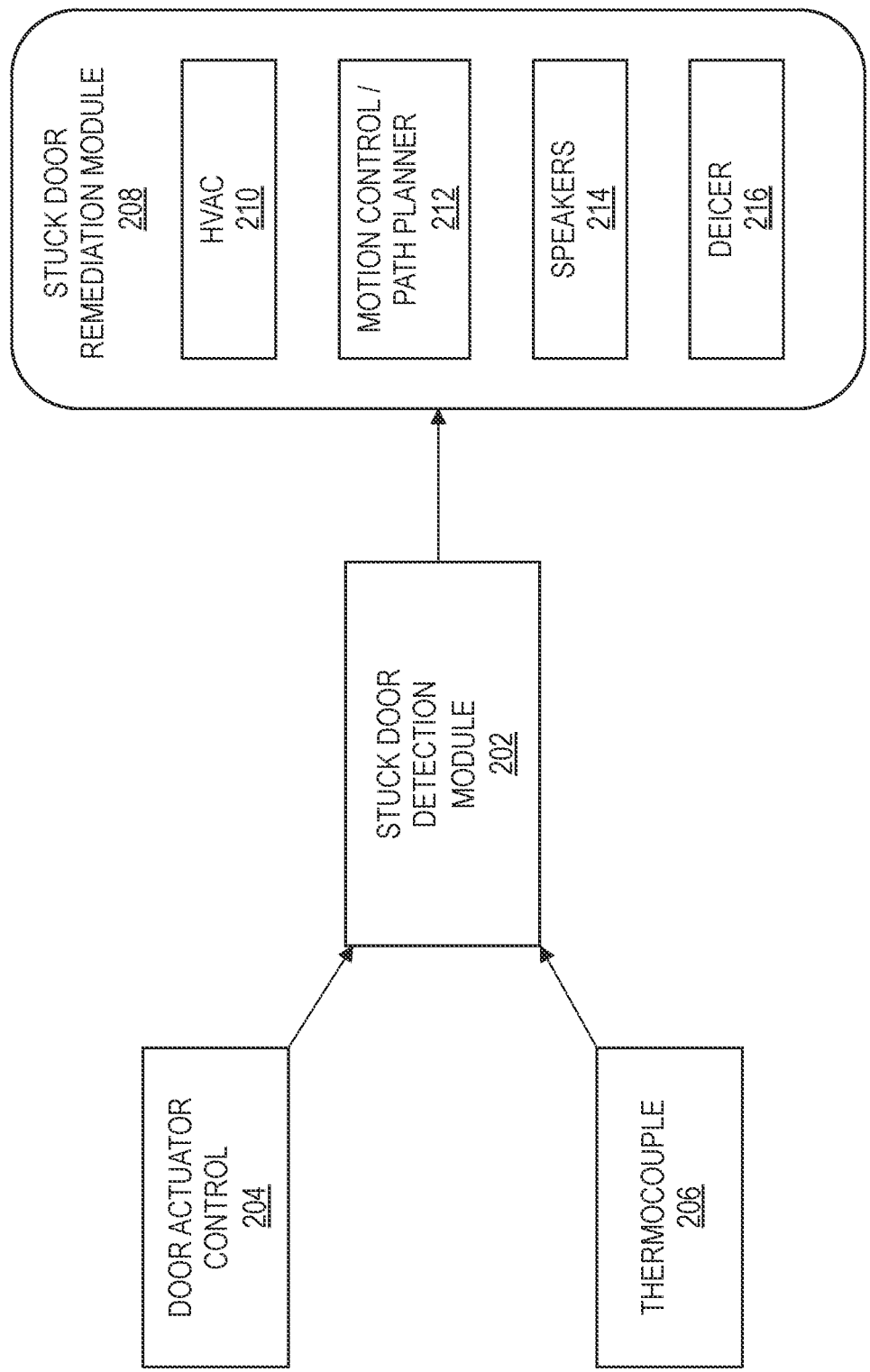
FIG. 2 is a block diagram illustrating a stuck door detection module, according to various examples of the present disclosure.

FIG. 2 is a block diagram illustrating a stuck door detection module 202, according to various examples of the present disclosure. The stuck door detection module 202 can be configured to detect a stuck vehicle door. Additionally, the stuck door detection module 202 can detect the formation of ice at an interface between a vehicle door and the vehicle body. In various examples, the stuck door detection module 202 is in communication with a remediation module 208 that can take various remedial actions to attempt to move the door. Additionally, the stuck door detection module 202 can be in communication with a central computer and can update the central computer on the status of the stuck door. In some examples, the stuck door remediation module 208 is in communication with the central computer and updates the central computer on the status of the stuck door.

According to various implementations, the stuck door detection module 202 receives input sensor data from various sensors. In particular, the stuck door detection module 202 receives input from a door actuator control module 204 and a thermocouple 206. The door actuator control module 204 can be configured to open and close the vehicle doors. In some examples, each vehicle door has a door actuator control module 204, and the door actuator control modules 204 each communicate with the stuck door detection module 202. In some examples, a vehicle door can have multiple door actuators, for example one door actuator for moving the door along a top rail and one door actuator for moving the door along a bottom rail. In some examples, each door actuator has a door actuator control module 204. In other examples, one door actuator control module 204 controls both the top and bottom door actuators for a vehicle door. Similarly, in some examples, one door actuator control module 204 can be in communication with door actuators for multiple doors.

When a vehicle door is stuck and does not open in response to the door actuator control module 204 door-opening actuation signal, a spike in motor current can occur. In some examples, the stuck door detection module 202 detects the spike in motor current of the door actuator control module 204. In some examples, the stuck door detection module 202 detects a spike in motor force at the door actuator control module 204. In some examples, the door actuator control module 204 communicates the spike in current with the stuck door detection module 202. Similarly, when a vehicle door is stuck and does not open in response to the door actuator control module 204 door-opening actuation signal, the unexpected reduction in (or complete absence of) movement of the door in response to the door-opening actuation can be detected by the stuck door detection module 202. For a vehicle such as the vehicle 110 of FIG. 1A, the unexpected lack of lateral movement of one or more doors 122a, 122b in response to the door-opening actuation can be detected by the stuck door detection module 202. Thus, the stuck door detection module 202 can detect a stuck door based on door actuator control module 204 data.

Additionally, the stuck door detection module 202 receives temperature data from a thermocouple 206. Based on the temperature data, the stuck door detection module 202 can determine whether ice formation around the door is a possibility. If the temperature at the thermocouple is below a selected threshold, the stuck door detection module 202 can determine that the door can be stuck due to ice formation. For example, if the temperature at the thermocouple is at or below freezing, the stuck door detection module 202 can determine that the door can be stuck due to ice formation. In other examples, if the temperature at the thermocouple is within a few degrees of freezing, the stuck door detection module 202 can determine that the door can be stuck due to ice formation. In some examples, the temperature at the thermocouple can increase to above freezing while ice is still present around the stuck door, as the ice has not yet had time to melt. However, in some examples, if the temperature at the thermocouple is above a selected threshold temperature, the stuck door detection module 202 can determine that the door is not stuck due to ice formation. For instance, if the temperature at the thermocouple is at or above fifty degrees fahrenheit, the stuck door detection module 202 can determine that the door is not stuck due to ice formation. In some examples, the stuck door detection module 202 can monitor temperatures measured at the thermocouple over time, and the stuck door detection module 202 can determine that the door may be stuck due to ice formation if the temperature at the thermocouple 206 has been at or below freezing during a selected time window preceding the detection of the stuck door. For instance, if the temperature had been at or below freezing within the previous few hours, ice may have formed between the vehicle door and the vehicle body and not yet melted.

In some examples, a vehicle door can be stuck for reasons other than ice formation. The stuck door detection module 202 can identify a stuck door and identify that ice is not the cause. In some examples, a vehicle door can be stuck due to a vandalism event and/or a prank. For instance, a vehicle door can be taped closed, with tape attaching the vehicle door to the vehicle frame around the edges of the vehicle door. Similarly, tape could be placed around the outside of the vehicle as part of a vandalism event or prank, preventing the vehicle door from opening. In some examples, a hardware malfunction can cause the vehicle door to remain stuck. For example, door support rollers can seize, such that the doors rollers no longer roll along one or more of the door tracks. Similarly, other door support structure can fail.

According to various implementations, the stuck door detection module 202 also communicates with a stuck door remediation module 208. Based on feedback from the stuck door detection module 202 indicating the formation of ice causing the stuck door, the stuck door remediation module 208 can initiate one or more remedial actions to attempt to melt and/or dislodge the ice and free the stuck door. The stuck door remediation module 208 can activate one or more of multiple remediation techniques, including HVAC (heating, ventilation, air conditioning) 210, a motion control/path planner 212, speakers 214, and a deicer 216.

In some examples, the stuck door remediation module 208 can signal an HVAC system 210 to increase the duty cycle of door window defrosters. In particular, the stuck door remediation module 208 can signal the HVAC system 210 to blow hot air close to the interface between the stuck vehicle door and the vehicle body. In some examples, a vehicle can include HVAC vents that can be controlled by the stuck door remediation module 208 and directed to the interface between the vehicle door and the vehicle body. Additionally, the stuck door remediation module 208 can signal an HVAC system 210 to increase the temperature inside the vehicle, thereby causing the temperature at the interface between the stuck vehicle door and the vehicle body to increase and melting the ice.

In some examples, the stuck door remediation module 208 can communicate with a motion control and path planner 212 to guide the vehicle over uneven surfaces in order to introduce torsional flex between the vehicle body and the stuck vehicle door. The torsional flex can loosen and break the ice away from the interface between the stuck vehicle door and the vehicle body, allowing the vehicle door to become unstuck. In some examples, vehicle accelerometers can provide continuous and/or periodic feedback on the amount of torsional flex of the vehicle body as the vehicle drives. In various examples, the motion control and path planner 212 accesses a map database that includes map data on road surfaces, including the evenness and unevenness (or bumpiness) of various roads and/or road segments. The motion control and path planner 212 can design a route for the vehicle including roads with uneven surfaces. In some examples, the motion control and path planner 212 designs a route that maximizes the occurrence of uneven road surfaces. The route can be a selected distance or the route can be estimated to take a selected amount of time for the vehicle to drive. In some examples, the route can take the vehicle in the direction of a maintenance facility or another potential next destination.

In some examples, vehicle speakers 214 can be used to emit a low frequency sound to break apart the ice at the interface between the stuck vehicle door and the vehicle body. In particular, the low frequency vibrations created by the low frequency sound can cause the ice to break apart. In some examples, there is a speaker in each vehicle door. The respective door speakers can be positioned in the lower half of the door, below the door windows. In some examples, the door speakers are used to emit the low frequency sound. In some examples, other vehicle speakers can be used to emit the low frequency sound.

In some examples, the vehicle includes a deicing module 216 that can spray a deicing solution on the interface between the stuck vehicle door and the vehicle body. The deicing solution can be similar to windshield deicing solutions and designed to melt ice on contact. In some examples, the interface between the vehicle door and the vehicle body includes a channel through which heat and/or hot air can travel to help melt any ice present at the interface.

In some examples, the stuck door remediation module 208 activates one or more remedial actions for a selected period of time, and the stuck door detection module 202 rechecks the stuck door at the end of the selected period of time to determine whether the stuck door remains stuck, or whether the remedial actions have succeeded in allowing the stuck door to activate and open. If the stuck door remains stuck, the stuck door remediation module 208 again activates one or more remedial actions for a selected period of time. In various examples, as long as the stuck door remains stuck, the stuck door remediation module 208 can repeatedly activate one or more remedial actions a selected number of times or for a selected period of time. After the selected number of times or the selected period of time, the stuck door remediation module 208 can signal to a central computer and/or fleet management module that the vehicle is to return to a service or maintenance facility to have the stuck door manually released. In some examples, the stuck door remediation module 208 can communicate with a central computer and/or fleet management module that the vehicle is to drive to a facility that is maintained at a selected temperature above freezing in order to melt any ice on the vehicle.

In various examples, when a stuck door is detected, the stuck door remediation module can determine whether there is a passenger inside the vehicle. If there is a passenger in the vehicle, the stuck door remediation module 208 can determine whether another vehicle door can be opened. If more than one vehicle door is stuck and the passenger(s) is unable to exit the vehicle, a field support representative can be deployed to assist the passenger(s). When no passengers are affected by the stuck door, the vehicle can be dispatched to a maintenance facility for repair.

Example Method for Stuck Door Detection and Remediation

Figure 3:
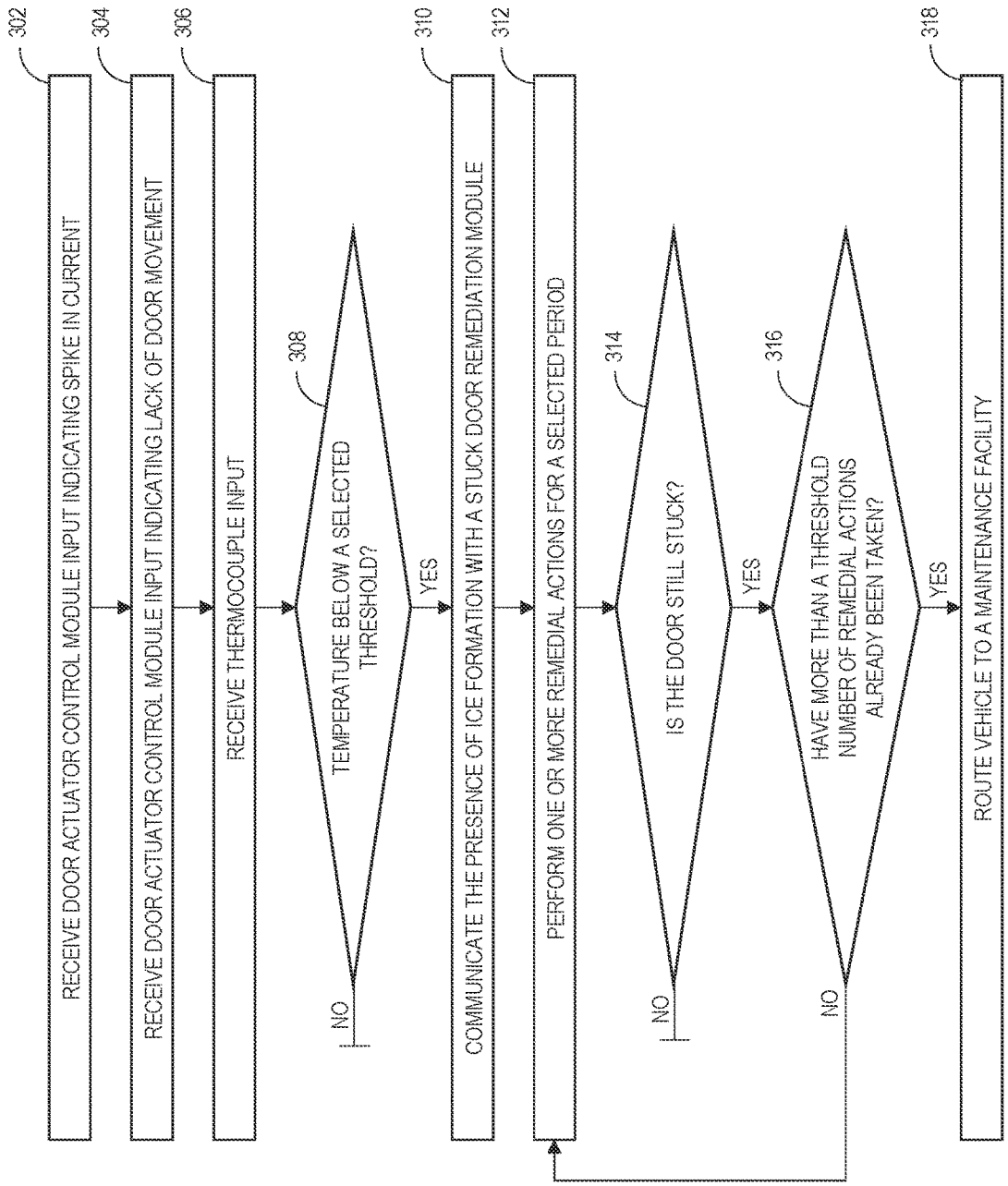
FIG. 3 is a flow chart illustrating a method for detecting and remediating a stuck door due to ice formation, according to some examples of the present disclosure.

FIG. 3 is a flow chart illustrating a method 300 for detecting and remediating a stuck door due to ice formation, according to various examples of the present disclosure. At step 302, an input from a door actuator control module is received, indicating a spike in current at the door actuator control module. According to various examples, the spike in current occurs when the vehicle door does not respond to the door actuator motor attempting to open the vehicle door and remains closed. The door actuator motor uses a greater force to work harder to try and open the vehicle door, causing the spike in the current. At step 304, an input is received from the door actuator control module indicating a lack of vehicle door movement. In some examples, the actuator control module senses a vehicle door location and determines the vehicle door is still closed and has not opened. In various examples, the inputs from the door actuator control module at steps 302 and 304 are received at a stuck door detection module.

At step 306, a thermocouple input is received at the stuck door detection module. The thermocouple input can indicate a temperature of a vehicle surface in close proximity to an interface between the vehicle door and the vehicle body. In some examples, the thermocouple input can indicate an ambient temperature. At step 308, the stuck door detection module determines whether the temperature is below a selected threshold. In particular, as described above with respect to FIG. 2, the stuck door detection module determines whether it is cold enough for ice to have formed at the interface between the vehicle door and the vehicle body. In some examples, the stuck door detection module receives temperature data over time, and in some examples, the stuck door detection module receives a history of temperature data for a selected period of time. If temperature is below a selected threshold indicating the possibility of ice formation at the interface between the vehicle door and the vehicle body, the method 300 proceeds to step 310. If the temperature is at or above the selected threshold, the method 300 ends, because it is too warm for ice to have formed and caused the vehicle door to become stuck.

At step 310, the likely presence of ice formation causing the vehicle door to become stuck is communicated with a stuck door remediation module. In some examples, the stuck door detection module communicates the presence of ice formation causing the vehicle door to become stuck is communicated with a stuck door remediation module.

At step 312, one or more remedial actions is performed for a selected period of time. Remedial actions include any actions to unstick the vehicle door and allow it to open. In particular, remedial actions can include any actions that affect the ice formed at the interface between the vehicle door and the vehicle body, for example actions that melt a portion of the ice and actions that dislodge or remove a portion of the ice. Some examples include applying heat near the ice, cracking the ice, vibrating the ice, and applying a substance to melt the ice.

In some examples, the remedial action is activating an HVAC system to increase the duty cycle of vehicle defrosters, and in particular to increase the duty cycle of defrosters that defrost vehicle door windows. In some examples, the HVAC system can blow hot air close to the interface between the stuck vehicle door and the vehicle body. In some examples, a vehicle can include HVAC vents that can be directed to the interface between the vehicle door and the vehicle body. Additionally, in some examples, the HVAC system can increase the temperature inside the vehicle, thereby causing the temperature at the interface between the stuck vehicle door and the vehicle body to increase and causing the ice to being melting.

In some examples, the remedial action includes communicating with a motion control and path planner to guide the vehicle over uneven surfaces in order to introduce torsional flex between the vehicle body and the stuck vehicle door. The torsional flex can loosen and break the ice away from the interface between the stuck vehicle door and the vehicle body, allowing the vehicle door to become unstuck. In some examples, accelerometer data from vehicle accelerometers positioned near the vehicle door can provide continuous and/or periodic feedback on the amount of torsional flex of the vehicle body as the vehicle drives. In various examples, a path planner accesses a map database that includes map data on road surfaces, including the evenness and unevenness of various roads and/or road segments. A route can be generated for the vehicle including roads with uneven surfaces. In some examples, a route is generated that maximizes the occurrence of uneven road surfaces. The route can be a selected distance or the route can be estimated to take a selected amount of time for the vehicle to drive. In some examples, the route can take the vehicle in the direction of a maintenance facility or another potential next destination. In some examples, the remedial action of driving the vehicle over uneven surfaces in order to introduce torsional flex is performed over a selected distance rather than over a selected period of time, and/or the selected period of time is the time it takes the vehicle to drive the selected distance.

In some examples, the remedial action includes emitting a low frequency sound to break apart the ice at the interface between the stuck vehicle door and the vehicle body. In particular, the low frequency vibrations created by the low frequency sound can cause the ice to break apart. In some examples, the remedial action includes spraying a deicing solution from a vehicle sprayer on to the interface between the stuck vehicle door and the vehicle body. In some examples, the interface between the vehicle door and the vehicle body includes a channel through which heat and/or hot air can travel to help melt any ice present at the interface, and the remedial action includes injecting hot air into the channel.

In some examples, the one or more remedial actions is performed for a selected period of time. At the end of the selected period of time, the method 300 proceeds to step 314, and it is determined whether the door is still stuck. If the door is no longer stuck at step 314, the method 300 ends. If the door is still stuck, the method 300 proceeds to step 316, and it is determined whether more than a threshold number of remedial actions have been performed. In particular, the number of remedial action that have been performed is compared with a threshold number. In some examples, a remedial action performed for a first period of time is considered one remedial action, and the same remedial action performed for a second period of time is considered another remedial action. Thus, increasing the duty cycle of the defrosters for a first period of time and then continuing the increased duty cycle of the defrosters for a second period of time can be counted as two remedial actions. In some examples, a remedial action performed for a first period of time is considered one remedial action, and a different remedial action also performed during the first period of time is considered another remedial action. Thus, increasing the duty cycle of the defrosters for a first period of time and simultaneously driving the vehicle over uneven surfaces in order to introduce torsional flex during the first period of time can be counted as two remedial actions. At step 316, if the number of remedial actions that have been performed is less than or equal to the threshold number, the method 300 returns to step 312 and further remedial actions are performed. At step 316, if the number of remedial actions that have been performed in greater than the threshold number, the method proceeds to step 318, and the vehicle is routed to a maintenance facility for remediation of the stuck door.

In some examples, the facility can be a parking facility. In some examples, the facility can be a heated parking facility, and any ice formed on the vehicle or at the interface between a vehicle door and the vehicle body can melt over time when in the heated parking facility. In some examples, the facility includes a service area where a vehicle can drive for service.

Example of an Autonomous Vehicle Fleet System Stuck Door Detection

Figure 4:
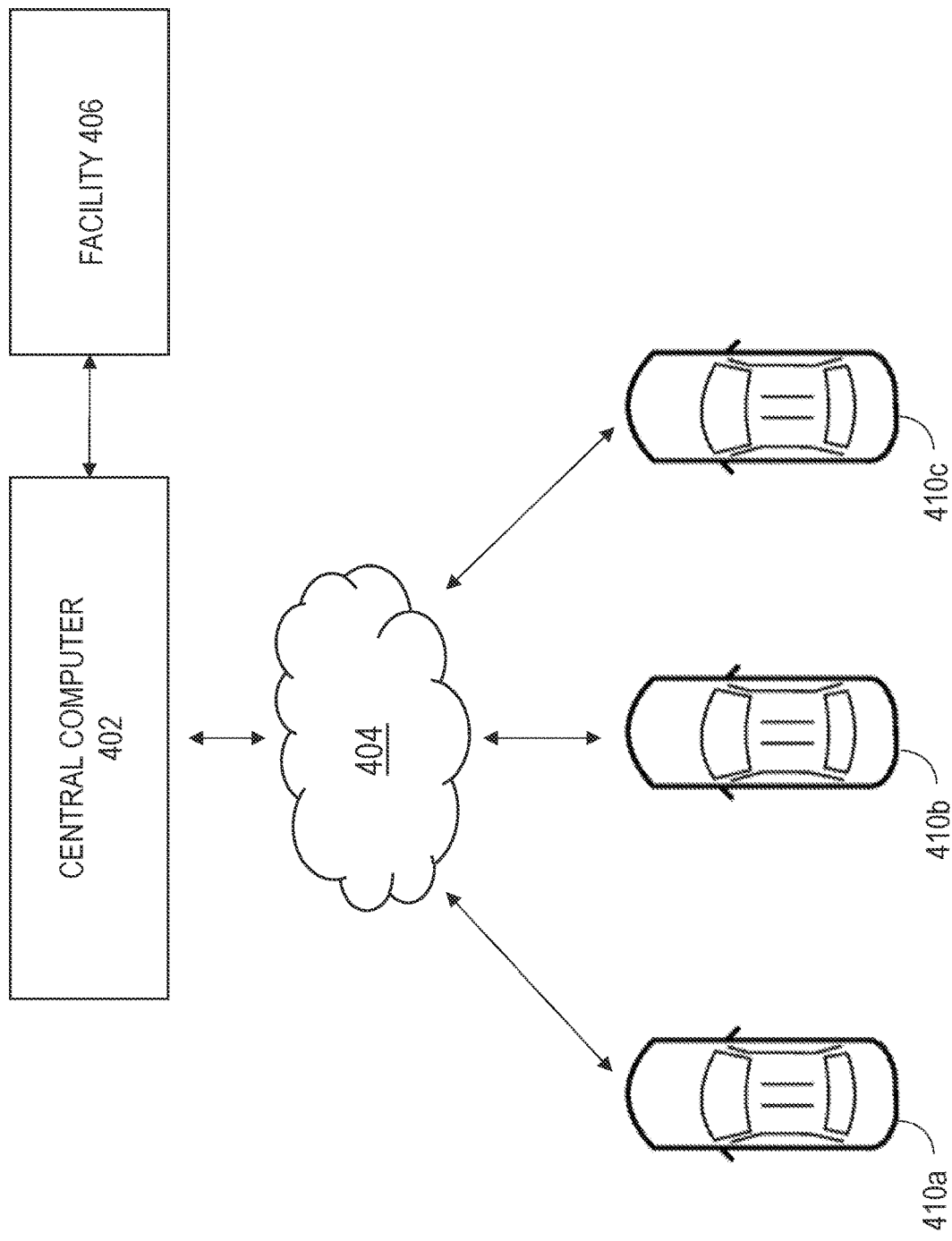
FIG. 4 is a diagram illustrating a fleet of autonomous vehicles in communication with a central computer, according to some embodiments of the disclosure.

FIG. 4 is a diagram 400 illustrating a fleet of autonomous vehicles 410a, 410b, 410c in communication with a central computer 402, according to some embodiments of the disclosure. The vehicles 410a-410c communicate wirelessly with a cloud 404 and a central computer 402. The central computer 402 includes a routing coordinator, a dispatch service, and a database of information from the vehicles 410a-410c in the fleet. In various examples, the vehicles 410a-410c communicate stuck door detection data with the central computer 402. In some examples, the vehicles 410a-410c communicate stuck door remediation data with the central computer 402. In some examples, the database of information can include ice formation data for fleet vehicles 410a-410c. The central computer 402 can monitor ice formation and vehicle door operations across the vehicles 410a-410c in the fleet to schedule and prioritize remediation activities.

Autonomous vehicle fleet routing refers to the routing of multiple vehicles in a fleet. The central computer 402 also communicates with various vehicle facilities such as the vehicle facility 406. In some examples, a dispatch system at the central computer 402 can communicate a service instruction to any of the vehicles 410a-410c. In some examples, ice has formed on a vehicle 410a-410c, and the ice has caused a vehicle door of the vehicle 410a-410c to become stuck. The dispatch system can then route the vehicle 410a-410c to a facility 406 to melt the ice and/or for service to fix the stuck door.

As described above, each vehicle 410a-410c in the fleet of vehicles communicates with a routing coordinator. Thus, information gathered by various autonomous vehicles 410a-410c in the fleet can be saved and used to generate information for future routing determinations. For example, sensor data can be used to generate route determination parameters. In some examples, sensor data can be used to identify uneven road surfaces, and a vehicle 410a-410c can be routed to an uneven route surfaces as a remedial action to release a stuck door, as described above. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns. In some examples, the routing coordinator generates a route for a vehicle to the facility 406. In some examples, a vehicle has one or more scheduled stops before embarking on its route to the facility 406.

Example Autonomous Vehicle Management System

Figure 5:
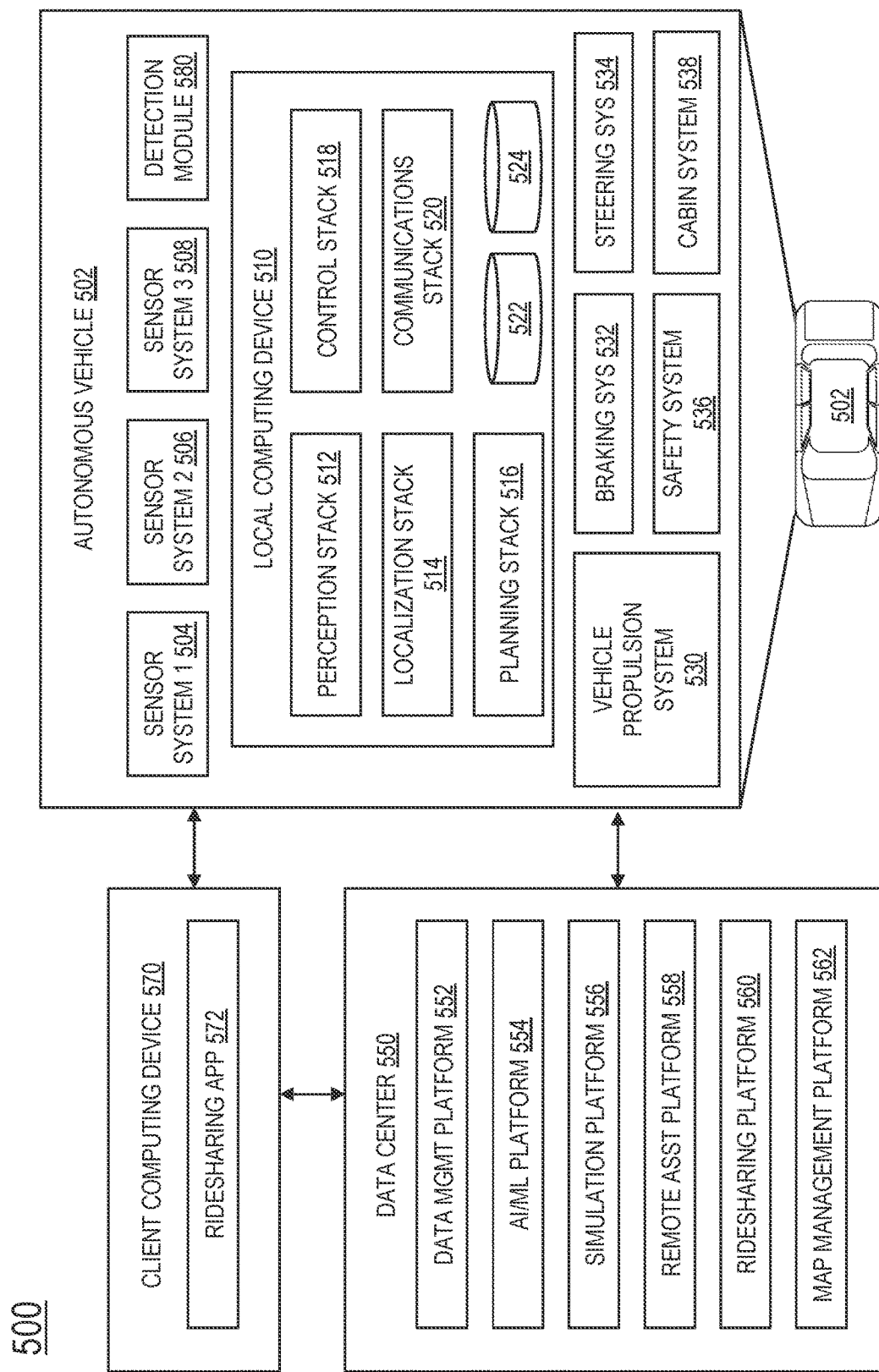
FIG. 5 illustrates an example system environment that can be used to facilitate autonomous vehicle (AV) dispatch and operations, according to some aspects of the disclosed technology.

Turning now to FIG. 5, this figure illustrates an example of an AV management system 500. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 502 can navigate about roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors. In various examples, the sensor systems can be used to detect ice formation on the AV 502. In some examples, a stuck door detection module 580 can receive data from the sensor systems 504, 506, 508. In some examples, the stuck door detection module 580 receives temperature data from a thermocouple. In some examples, the stuck door detection module receives data from a vehicle door actuation module, as described herein. The stuck door detection module 580 identifies ice formation at an interface between a vehicle door and a vehicle body based on the received data. In some examples, the detection module 580 includes a stuck door remediation module as described herein.

AV 502 can also include several mechanical systems that can be used to maneuver or operate AV 502. For instance, the mechanical systems can include vehicle propulsion system 530, braking system 532, steering system 534, safety system 536, and cabin system 538, among other systems. Vehicle propulsion system 530 can include an electric motor, an internal combustion engine, or both. The braking system 532 can include an engine brake, a wheel braking system (e.g., a disc braking system that utilizes brake pads), hydraulics, actuators, and/or any other suitable componentry configured to assist in decelerating AV 502. The steering system 534 can include suitable componentry configured to control the direction of movement of the AV 502 during navigation. Safety system 536 can include lights and signal indicators, a parking brake, airbags, and so forth. The cabin system 538 can include cabin temperature control systems, in-cabin entertainment systems, and so forth. In some embodiments, the AV 502 may not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a planning stack 516, a control stack 518, a communications stack 520, a High Definition (HD) geospatial database 522, and an AV operational database 524, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 522, other components of the AV, and other data sources (e.g., the data center 550, the client computing device 570, third-party data sources, etc.). The perception stack 512 can detect and classify objects and determine their current and predicted locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth. The perception stack 512 can be used in sentinel mode to sense the vehicle environment and identify objects.

Mapping and localization stack 514 can determine the AV's position and orientation (pose) using different methods from multiple systems (e.g., GPS, IMUs, cameras, LIDAR, RADAR, ultrasonic sensors, the HD geospatial database 522, etc.). For example, in some embodiments, the AV 502 can compare sensor data captured in real-time by the sensor systems 504-508 to data in the HD geospatial database 522 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The planning stack 516 can determine how to maneuver or operate the AV 502 safely and efficiently in its environment. For example, the planning stack 516 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 502 from one point to another. The planning stack 516 can determine multiple sets of one or more mechanical operations that the AV 502 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 516 can select from multiple backup plans to carry out. For example, while preparing to change lanes to turn right at an intersection, another vehicle may aggressively cut into the destination lane, making the lane change unsafe. The planning stack 516 could have already determined an alternative plan for such an event, and upon its occurrence, help to direct the AV 502 to go around the block instead of blocking a current lane while waiting for an opening to change lanes.

The control stack 518 can manage the operation of the vehicle propulsion system 530, the braking system 532, the steering system 534, the safety system 536, and the cabin system 538. The control stack 518 can receive sensor signals from the sensor systems 504-508 as well as communicate with other stacks or components of the local computing device 510 or a remote system (e.g., the data center 550) to effectuate operation of the AV 502. For example, the control stack 518 can implement the final path or actions from the multiple paths or actions provided by the planning stack 516. This can involve turning the routes and decisions from the planning stack 516 into commands for the actuators that control the AV's steering, throttle, brake, and drive unit.

The communication stack 520 can transmit and receive signals between the various stacks and other components of the AV 502 and between the AV 502, the data center 550, the client computing device 570, and other remote systems. The communication stack 520 can enable the local computing device 510 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 520 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 522 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 524 can store raw AV data generated by the sensor systems 504-508 and other components of the AV 502 and/or data received by the AV 502 from remote systems (e.g., the data center 550, the client computing device 570, etc.). In some embodiments, the raw AV data can include HD LIDAR point cloud data, image or video data, RADAR data, GPS data, and other sensor data that the data center 550 can use for creating or updating AV geospatial data as discussed further below with respect to FIG. 5 and elsewhere in the present disclosure.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes one or more of a data management platform 552, an Artificial Intelligence/Machine Learning (AI/ML) platform 554, a simulation platform 556, a remote assistance platform 558, a ridesharing platform 560, and a map management platform 562, among other systems.

Data management platform 552 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from the map management platform 562; modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to be picked up or dropped off from the ridesharing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
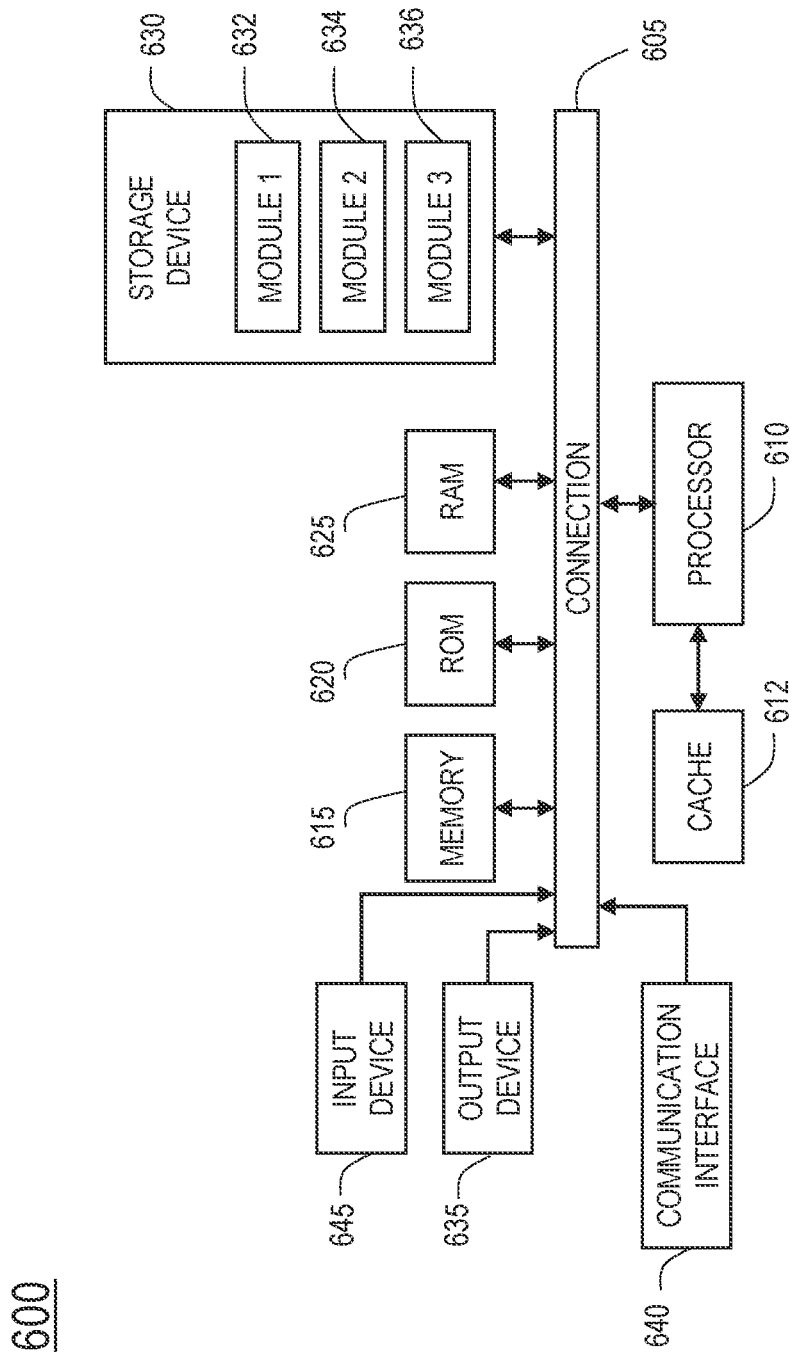
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric. In some examples, the processor 610 is an image processor that can process images from vehicle image sensors. In some examples, the processor 610 can determine a sensor field of view. In some examples, the processor 610 can stitch together captured images from adjacent image sensors.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a vehicle for detection of a stuck door due to ice formation, comprising a thermocouple configured to determine a temperature; a door actuator control configured to generate a door actuator current for opening a vehicle door; a stuck door detection module configured to: receive a measurement of the door actuator current from the door actuator control, detect a spike in the measurement of the door actuator current, detect a lack of door movement of the vehicle door in response to the door actuator current and determine the vehicle door is in a stuck position, determine that the temperature is below a selected threshold, and identify a formation of ice at an interface between a vehicle body and the vehicle door; and a stuck door remediation module configured to perform at least one remedial action to release the vehicle door from the stuck position, wherein the remedial action is configured to at least one of melt the ice and dislodge the ice.

Example 2 provides a method, system, and/or vehicle according to any of the preceding and/or following examples, wherein the temperature is a surface temperature of a vehicle surface in proximity to the interface between the vehicle body and the vehicle door.

Example 3 provides a method, system, and/or vehicle according to any of the preceding and/or following examples, wherein the stuck door remediation module is further configured to communicate with an HVAC system to increase a duty cycle of defrosters.

Example 4 provides a method, system, and/or vehicle according to any of the preceding and/or following examples, wherein the stuck door remediation module is configured to communicate with the HVAC system to direct HVAC heat vents towards the interface between the vehicle body and the vehicle door.

Example 5 provides a method, system, and/or vehicle according to any of the preceding and/or following examples, wherein the stuck door remediation module is further configured to communicate with a path planner to guide the vehicle over uneven surfaces to generate torsional flex between the vehicle body and the vehicle door to dislodge the ice and release the vehicle door from the stuck position.

Example 6 provides a method, system, and/or vehicle according to any of the preceding and/or following examples, wherein the vehicle further includes a plurality of accelerometers on the vehicle body, and wherein accelerometer data from the plurality of accelerometers is used to determine a torsional flex measurement.

Example 7 provides a method, system, and/or vehicle according to any of the preceding and/or following examples, wherein the stuck door detection module is configured to determine that the vehicle door is in the stuck position at a first time, wherein the stuck door remediation module is further configured to perform the at least one remedial action for a selected period of time, and, after an end of the selected period of time, at a second time, the stuck door detection module is configured to recheck the vehicle door to determine whether the vehicle door remains in the stuck position at the second time.

Example 8 provides a method, system, and/or vehicle according to any of the preceding and/or following examples, wherein the stuck door remediation module is further configured to communicate a stuck door status with a central computer and route the vehicle to a vehicle facility Example 9 provides a method for stuck vehicle door detection due to ice formation, comprising: receiving a measurement of a door actuator current generated to open a vehicle door; detecting a spike in the measurement of the door actuator current; detecting a lack of door movement of the vehicle door in response to the door actuator current; determining the vehicle door is in a stuck position; determining a temperature of a vehicle surface in proximity to the vehicle door is below a selected threshold; identifying a formation of ice at an interface between the vehicle body and the vehicle door; performing at least one remedial action to release the vehicle door from the stuck position, wherein the remedial action is configured to at least one of melt the ice and dislodge the ice.

Example 10 provides a method, system, and/or vehicle according to any of the preceding and/or following examples, wherein performing the at least one remedial action includes communicating with an HVAC system to increase a duty cycle of defrosters to melt the ice.

Example 11 provides a method, system, and/or vehicle according to any of the preceding and/or following examples, wherein performing the at least one remedial action includes communicating with an HVAC system to direct HVAC heat vents towards the interface between the vehicle body and the vehicle door to melt the ice.

Example 12 provides a method, system, and/or vehicle according to any of the preceding and/or following examples, wherein performing the at least one remedial action includes communicating with a path planner to guide the vehicle over uneven surfaces to generate torsional flex between the vehicle body and the vehicle door to dislodge the ice and release the vehicle door from the stuck position.

Example 13 provides a method, system, and/or vehicle according to any of the preceding and/or following examples, further comprising collecting accelerometer data from a plurality of accelerometers on the vehicle body, and determining a torsional flex measurement based on the accelerometer data.

Example 14 provides a method, system, and/or vehicle according to any of the preceding and/or following examples, wherein determining the vehicle door is in a stuck position includes determining the vehicle door is in a stuck position at a first time, wherein performing the at least one remedial action includes performing the at least one remedial action for a selected period of time, and, after an end of the selected period of time, rechecking the vehicle door, and determining, at a second time, whether the vehicle door remains in the stuck position at the second time.

Example 15 provides a method, system, and/or vehicle according to any of the preceding and/or following examples, further comprising communicating a stuck door status with a central computer and routing the vehicle to a vehicle facility.

Example 16 provides a system for detection of a stuck doors due to ice formation in a vehicle fleet, comprising: a plurality of vehicles, each vehicle including: a respective thermocouple configured to determine a temperature; a respective door actuator control configured to generate a door actuator current for opening a respective vehicle door; a respective stuck door detection module configured to: receive a measurement of the door actuator current from the respective door actuator control, detect a spike in the measurement of the door actuator current, detect a lack of door movement of the respective vehicle door in response to the door actuator current and determine the respective vehicle door is in a stuck position, determine that the temperature is below a selected threshold, and identify a formation of ice at an interface between a respective vehicle body and the respective vehicle door; and a respective stuck door remediation module configured to perform at least one remedial action to release the respective vehicle door from the stuck position, wherein the remedial action is configured to at least one of melt the ice and dislodge the ice; and a central computer in communication with each of the plurality of vehicles, and configured to receive a stuck door status from the respective stuck door remediation modules.

Example 17 provides a method, system, and/or vehicle according to any of the preceding and/or following examples, wherein the respective stuck door remediation modules are configured to transmit a request for a remediation facility to the central computer, receive a facility location from the central computer, and route the respective vehicle to the facility location.

Example 18 provides a method, system, and/or vehicle according to any of the preceding and/or following examples, wherein the respective stuck door remediation module is further configured to communicate with a respective HVAC system to increase a duty cycle of vehicle defrosters.

Example 19 provides a method, system, and/or vehicle according to any of the preceding and/or following examples, wherein the respective stuck door remediation module is configured to communicate with the respective HVAC system to direct HVAC heat vents towards the interface between the respective vehicle body and the respective vehicle door.

Example 20 provides a method, system, and/or vehicle according to any of the preceding and/or following examples, wherein the respective stuck door remediation module is further configured to communicate with a path planner to guide the vehicle over uneven surfaces to generate torsional flex between the respective vehicle body and the respective vehicle door to dislodge the ice and release the respective vehicle door from the stuck position.

Example 21 provides a vehicle for detection of a stuck door, comprising a thermocouple configured to determine a temperature; a door actuator control configured to generate a door actuator current for opening a vehicle door; a stuck door detection module configured to: receive a measurement of the door actuator current from the door actuator control, detect a spike in the measurement of the door actuator current, detect a lack of door movement of the vehicle door in response to the door actuator current and determine the vehicle door is in a stuck position, determine that the temperature is above a selected threshold, and determine there is no formation of ice at an interface between a vehicle body and the vehicle door; and a stuck door remediation module configured to perform at least one remedial action to release the vehicle door from the stuck position.

Example 22 provides a method, system, and/or vehicle according to any of the preceding and/or following examples, wherein the stuck door detection module is further configured to identify a cause of the vehicle door being in a stuck position, wherein the cause is one of vandalism and a hardware malfunction.

Example 23 provides a method, system, and/or vehicle according to any of the preceding and/or following examples, wherein the stuck door detection module is further configured to determine a vandalism event caused the vehicle door to become stuck.

Example 24 provides a method, system, and/or vehicle according to any of the preceding and/or following examples, wherein the stuck door detection module is further configured to determine a hardware malfunction caused the vehicle door to become stuck.

Example 25 provides a method, system, and/or vehicle according to any of the preceding and/or following examples, wherein the hardware malfunction includes door support rollers seizing.

Example 26 provides a method, system, and/or vehicle according to any of the preceding and/or following examples, wherein the hardware malfunction includes a door support structure failure.

Example 27 provides a method for stuck vehicle door detection, comprising: receiving a measurement of a door actuator current generated to open a vehicle door; detecting a spike in the measurement of the door actuator current; detecting a lack of door movement of the vehicle door in response to the door actuator current; determining the vehicle door is in a stuck position; determining a temperature of a vehicle surface in proximity to the vehicle door is above a selected threshold; determining there is no formation of ice at an interface between the vehicle body and the vehicle door; performing at least one remedial action to release the vehicle door from the stuck position.

Example 28 provides a method, system, and/or vehicle according to any of the preceding and/or following examples, further comprising identifying a cause of the vehicle door being in a stuck position, wherein the cause is one of vandalism and a hardware malfunction.

Example 29 provides a method, system, and/or vehicle according to any of the preceding and/or following examples, wherein performing the remedial action includes routing the vehicle to a service center.

Example 30 provides a method for stuck vehicle door detection, comprising: receiving a measurement of a door actuator current generated to open a vehicle door; detecting a spike in the measurement of the door actuator current; detecting a lack of door movement of the vehicle door in response to the door actuator current; determining the vehicle door is in a stuck position; determining there is no formation of ice at an interface between the vehicle body and the vehicle door; identifying a cause of the vehicle door being in a stuck position; performing at least one remedial action to release the vehicle door from the stuck position.

Example 31 includes a vehicle comprising means for performing the method of any of the examples 1-20.

Example 32 provides that a method of any of examples 1-31 is a computer-implemented method.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A vehicle for remediation of a stuck door due to ice formation, comprising:
    a thermocouple configured to determine a temperature;
    a door actuator control configured to generate a door actuator current for opening a vehicle door;
    a stuck door detection module configured to:
        receive a measurement of the door actuator current from the door actuator control,
        detect a spike in the measurement of the door actuator current,
        detect a lack of door movement of the vehicle door in response to the door actuator current and determine the vehicle door is in a stuck position,
        determine that the temperature is below a selected threshold, and
        identify a formation of ice at an interface between a vehicle body and the vehicle door; and
    a stuck door remediation module configured to:
        perform at least one remedial action to release the vehicle door from the stuck position, wherein the remedial action is configured to at least one of melt the ice and dislodge the ice; and
        communicate with a path planner to guide the vehicle over uneven surfaces to generate torsional flex between the vehicle body and the vehicle door to dislodge the ice and release the vehicle door from the stuck position.

2. The vehicle of claim 1, wherein the temperature is a surface temperature of a vehicle surface in proximity to the interface between the vehicle body and the vehicle door.

3. The vehicle of claim 1, wherein the stuck door remediation module is further configured to communicate with a heating, ventilation, air conditioning (HVAC) system to increase a duty cycle of defrosters.

4. The vehicle of claim 3, wherein the stuck door remediation module is configured to communicate with the HVAC system to direct HVAC heat vents towards the interface between the vehicle body and the vehicle door.

5. The vehicle of claim 1, wherein the vehicle further includes a plurality of accelerometers on the vehicle body, and wherein accelerometer data from the plurality of accelerometers is used to determine a torsional flex measurement.

6. The vehicle of claim 1, wherein the stuck door detection module is configured to determine that the vehicle door is in the stuck position at a first time, wherein the stuck door remediation module is further configured to perform the at least one remedial action for a selected period of time, and, after an end of the selected period of time, at a second time, the stuck door detection module is configured to recheck the vehicle door to determine whether the vehicle door remains in the stuck position at the second time.

7. The vehicle of claim 6, wherein the stuck door remediation module is further configured to communicate a stuck door status with a central computer and route the vehicle to a vehicle facility.

8. The method of claim 1, wherein determining the vehicle door is in a stuck position includes determining the vehicle door is in a stuck position at a first time, wherein performing the at least one remedial action includes performing the at least one remedial action for a selected period of time, and, after an end of the selected period of time, rechecking the vehicle door, and determining, at a second time, whether the vehicle door remains in the stuck position at the second time.

9. The method of claim 8, further comprising communicating a stuck door status with a central computer and routing the vehicle to a vehicle facility.

10. A method for stuck vehicle door remediation due to ice formation, comprising:
    receiving a measurement of a door actuator current generated to open a vehicle door;
    detecting a spike in the measurement of the door actuator current;
    detecting a lack of door movement of the vehicle door in response to the door actuator current;
    determining the vehicle door is in a stuck position;
    determining a temperature of a vehicle surface in proximity to the vehicle door is below a selected threshold;
    identifying a formation of ice at an interface between the vehicle body and the vehicle door;
    performing at least one remedial action to release the vehicle door from the stuck position, wherein the remedial action is configured to at least one of melt the ice and dislodge the ice,
    wherein performing the at least one remedial action includes communicating with an HVAC system to increase a duty cycle of defrosters to melt the ice, and
    wherein performing the at least one remedial action includes communicating with a heating, ventilation, air conditioning (HVAC) system to direct HVAC heat vents towards the interface between the vehicle body and the vehicle door to melt the ice.

11. The method of claim 10, wherein performing the at least one remedial action includes communicating with a path planner to guide the vehicle over uneven surfaces to generate torsional flex between the vehicle body and the vehicle door to dislodge the ice and release the vehicle door from the stuck position.

12. The method of claim 11, further comprising collecting accelerometer data from a plurality of accelerometers on the vehicle body, and determining a torsional flex measurement based on the accelerometer data.

13. A system for remediation of a stuck door due to ice formation in a vehicle fleet, comprising:
a plurality of vehicles, each vehicle including:
a respective thermocouple configured to determine a temperature;
a respective door actuator control configured to generate a door actuator current for opening a respective vehicle door;
a respective stuck door detection module configured to:
receive a measurement of the door actuator current from the respective door actuator control,
detect a spike in the measurement of the door actuator current,
detect a lack of door movement of the respective vehicle door in response to the door actuator current and determine the respective vehicle door is in a stuck position,
determine that the temperature is below a selected threshold, and
identify a formation of ice at an interface between a respective vehicle body and the respective vehicle door; and
a respective stuck door remediation module configured to perform at least one remedial action to release the respective vehicle door from the stuck position, wherein the remedial action is configured to at least one of melt the ice and dislodge the ice; and
a central computer in communication with each of the plurality of vehicles, and configured to receive a stuck door status from the respective stuck door remediation modules,
wherein the respective stuck door remediation modules are configured to transmit a request for a remediation facility to the central computer, receive a facility location from the central computer, and route the respective vehicle to the facility location.

14. The system of claim 13, wherein the respective stuck door remediation module is further configured to communicate with a respective a heating, ventilation, air conditioning (HVAC) system to increase a duty cycle of vehicle defrosters.

15. The system of claim 14, wherein the respective stuck door remediation module is configured to communicate with the respective HVAC system to direct HVAC heat vents towards the interface between the respective vehicle body and the respective vehicle door.

16. The system of claim 13, wherein the respective stuck door remediation module is further configured to communicate with a path planner to guide the vehicle over uneven surfaces to generate torsional flex between the respective vehicle body and the respective vehicle door to dislodge the ice and release the respective vehicle door from the stuck position.

* * * * *